(12) United States Patent
Gieras

(10) Patent No.: US 10,483,891 B2
(45) Date of Patent: Nov. 19, 2019

(54) DOUBLE STATOR PERMANENT MAGNET MACHINE WITH MAGNETIC FLUX REGULATION

(71) Applicant: HAMILTON SUNDSTRAND CORPORATION, Charlotte, NC (US)

(72) Inventor: Jacek F. Gieras, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 380 days.

(21) Appl. No.: 15/400,180

(22) Filed: Jan. 6, 2017

(65) Prior Publication Data
US 2018/0198395 A1  Jul. 12, 2018

(51) Int. Cl.
*H02P 9/32* (2006.01)
*H02K 16/04* (2006.01)
(Continued)

(52) U.S. Cl.
CPC ............... *H02P 9/32* (2013.01); *H02K 16/04* (2013.01); *H02K 21/046* (2013.01); *H02K 21/12* (2013.01); *H02P 9/302* (2013.01); *H02P 21/06* (2013.01)

(58) Field of Classification Search
CPC . H02P 9/32; H02P 9/302; H02P 21/06; H02K 16/04; H02K 21/046; H02K 21/12
See application file for complete search history.

(56) References Cited

U.S. PATENT DOCUMENTS

| | | | |
|---|---|---|---|
| 5,773,910 A * | 6/1998 | Lange | H02K 1/27 310/156.02 |
| 6,459,185 B1 * | 10/2002 | Ehrhart | H02K 1/20 310/156.35 |

(Continued)

FOREIGN PATENT DOCUMENTS

| | | |
|---|---|---|
| CN | 106026597 A | 10/2016 |
| EP | 2985422 A1 | 2/2016 |

(Continued)

OTHER PUBLICATIONS

"A Novel Structure of Dual-Stator Hybrid Excitation Synchronous Motor", Authors: Wang et al., IEEE Transactions on Applied Superconductivity, vol. 26, No. 4, Jun. 2016, 5 pgs.

(Continued)

*Primary Examiner* — Emily P Pham
(74) *Attorney, Agent, or Firm* — Cantor Colburn LLP

(57) ABSTRACT

Embodiments herein relate to a permanent magnet (PM) dynamoelectric machine. The machine includes a drive shaft, a PM rotor assembly with multiple PMs arranged around a periphery of the rotor assembly, a first stator assembly including a stator yoke, having stator teeth mounted to the stator core with distal ends proximate the outer periphery of the rotor assembly separated by a first air gap and multiple stator coils mounted between the stator teeth. The machine also includes a second stator assembly including a stator yoke, having stator teeth mounted to the stator core with distal ends forming closed slots, proximate an inner periphery of the rotor assembly separated by a second air gap and at least one control coil, the a control coil wrapped about a saturable region of the stator teeth thereof, each saturable region is operable to divert magnetic flux of the PMs through the stator teeth.

20 Claims, 8 Drawing Sheets

(51) Int. Cl.
*H02K 21/04* (2006.01)
*H02K 21/12* (2006.01)
*H02P 9/30* (2006.01)
*H02P 21/06* (2016.01)

(56) References Cited

U.S. PATENT DOCUMENTS

| | | | |
|---|---|---|---|
| 6,727,618 B1* | 4/2004 | Morrison | F16C 32/0493 |
| | | | 310/166 |
| 6,965,183 B2 | 11/2005 | Dooley | |
| 7,777,384 B2 | 8/2010 | Gieras et al. | |
| 7,791,245 B1 | 9/2010 | Hao et al. | |
| 7,843,155 B2 | 11/2010 | Rozman et al. | |
| 7,859,231 B2* | 12/2010 | Gieras | H02K 3/20 |
| | | | 310/180 |
| 9,018,863 B2 | 4/2015 | Hoeijmakers | |
| 9,143,024 B2 | 9/2015 | Kusase | |
| 10,090,741 B2* | 10/2018 | Kusase | H02K 1/276 |
| 2008/0203848 A1* | 8/2008 | Nymann | H02K 21/24 |
| | | | 310/268 |
| 2011/0285238 A1* | 11/2011 | Kusase | H02K 16/04 |
| | | | 310/156.48 |
| 2012/0159983 A1* | 6/2012 | Tsutsumi | H02K 17/205 |
| | | | 62/498 |
| 2013/0093275 A1* | 4/2013 | Kim | H02K 16/00 |
| | | | 310/114 |

FOREIGN PATENT DOCUMENTS

| | | |
|---|---|---|
| JP | H0345150 A | 2/1991 |
| JP | 2004260970 A | 9/2004 |
| JP | 2014220884 A | 11/2014 |

OTHER PUBLICATIONS

"PM Synchronous Generators with Hybrid Excitation Systems and Voltage Control Capabilities: A Review", Author: Jacek F. Gieras, Electrical Machines (ICEM), 2012 XXth International Conference on, IEEE, Sep. 2, 2012, pp. 2573-2579, XP032465070, DOI: 10.1109/ICELMACH.2012.6350248, ISBN: 978-1-4673-01412-8/ 12, 7 pgs.
European Search Report for Application No. 18150561.1 - 1201; dated Apr. 25, 2018; 9 pgs.
English Abstract for CN106026597A—dated Oct. 12, 2016; 1 pg.
English Translation of CN106026597A—dated Oct. 12, 2016; 5 pgs.

* cited by examiner

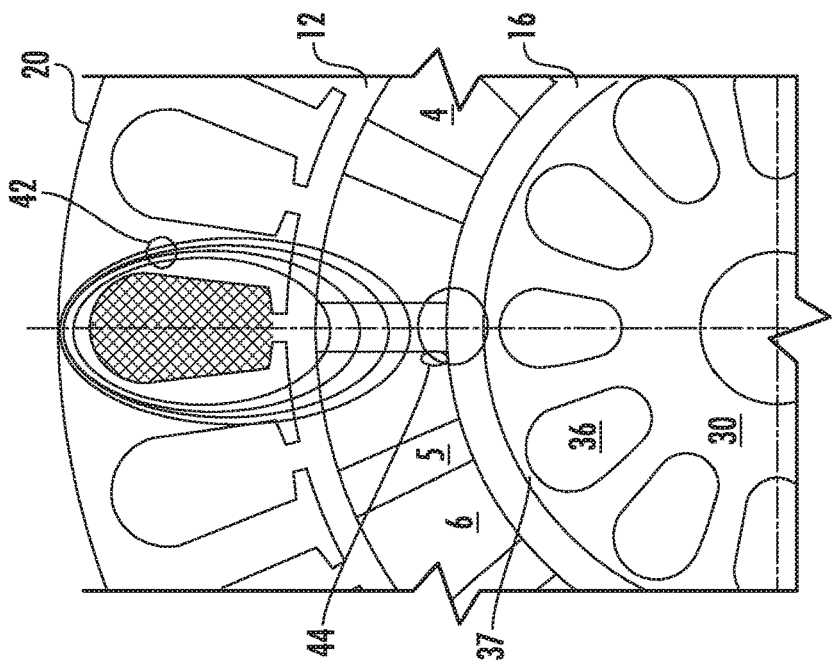
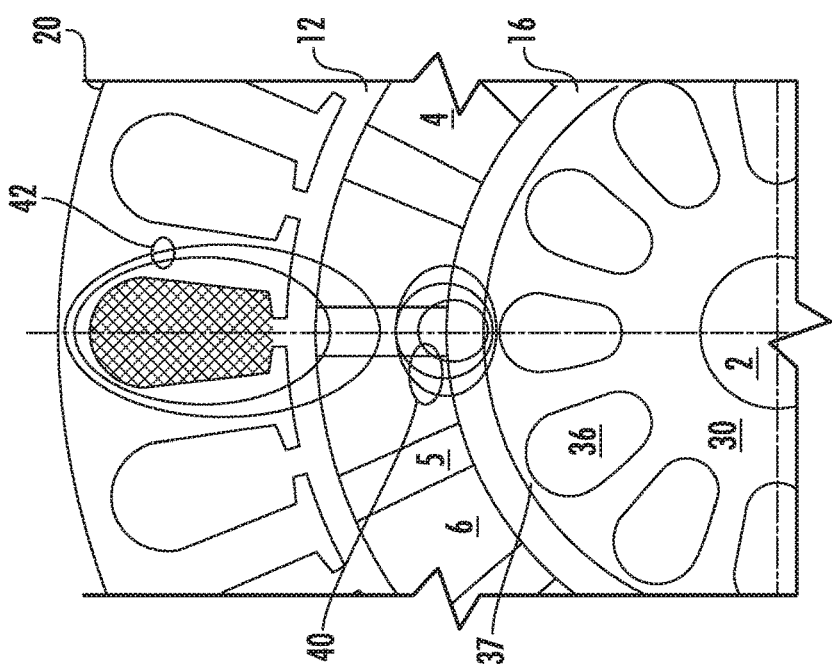

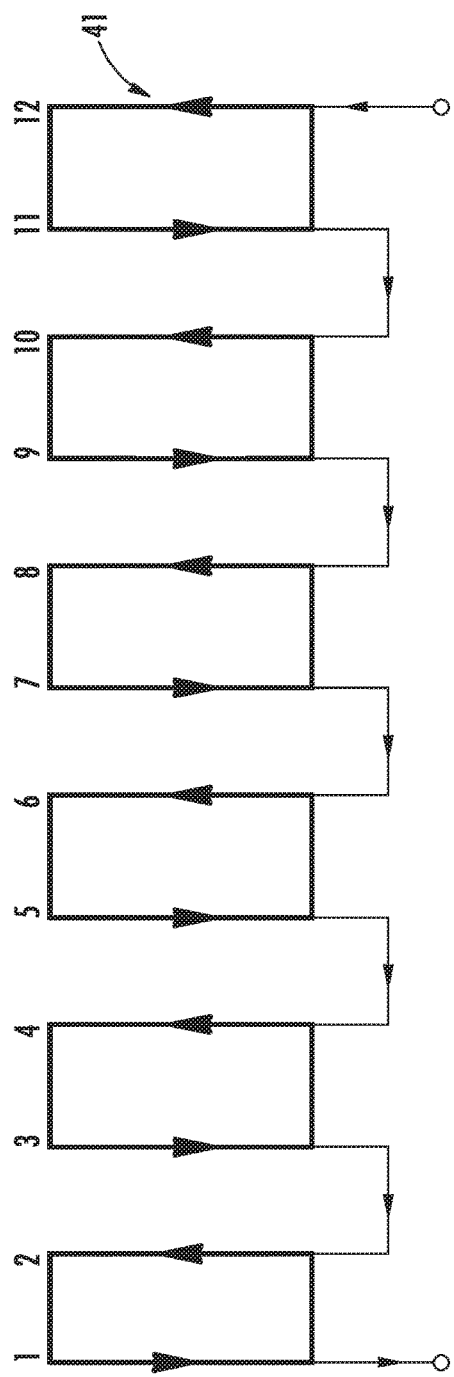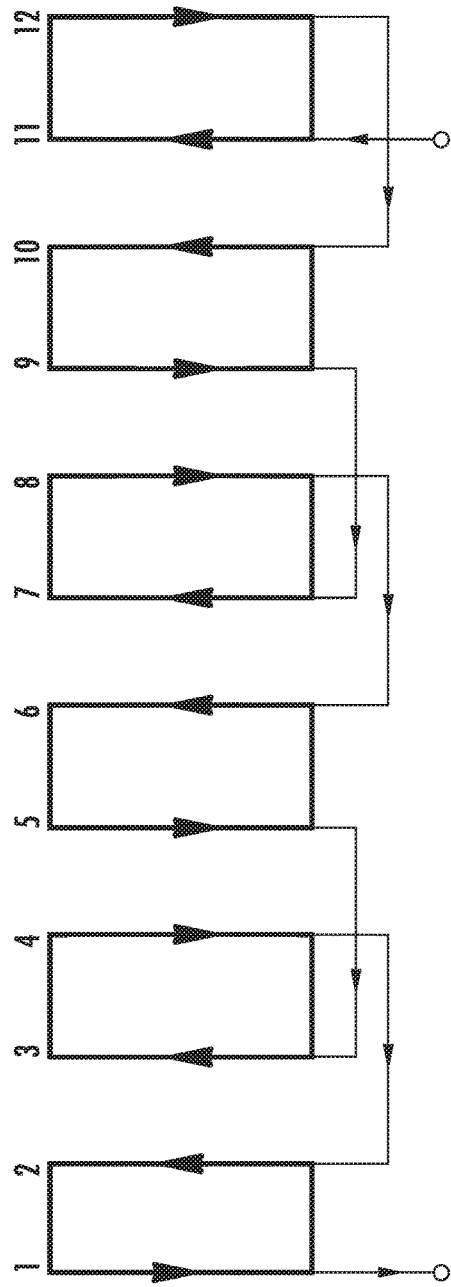
FIG. 6A
FIG. 6B

DOUBLE STATOR PERMANENT MAGNET MACHINE WITH MAGNETIC FLUX REGULATION

TECHNICAL FIELD

The invention relates to permanent magnet (PM) dynamoelectric machines, and more particularly to PIM dynamoelectric machines with variable magnetic flux excitation.

BACKGROUND

Permanent magnet (PM) brushless dynamoelectric machines have the highest power density in comparison with all other classical electrical machines. They also have very high efficiency and good dynamic performance. On the other hand PM brushless machines exhibit constant magnetic flux which, conventionally mandates use of an external solid state converter to maintain control. As a result, constant magnetic flux requirements may limit utilization of PM brushless machines in applications as generators when the prime mover speed is variable, e.g., aircraft generators. In addition, the constant magnetic flux also limits their utilization as variable-speed motors for selected applications, e.g., electric or hybrid-electric vehicle.

Control of magnetic excitation flux is not available in standard PM brushless dynamoelectric machines. Such control has previously only been practical with current vector control techniques. In vector control, a motor controller operates as an inverter system to inject the direct axis (d-axis) current that weakens the PM flux to a desired degree. However, such d-axis current injection to control magnetic flux excitation has certain drawbacks, such as a significant increase in stator winding losses that can result in excess heat dissipated in the stator winding and irreversible demagnetization of low energy density rotor PMs, such as rotor PMs of the ferrite type.

Electrical power generation systems powered by variable speed prime movers that require highly regulated electrical output, such as electrical power generation systems used for aeronautical applications, generally use a wound field synchronous machine (WFSM) that serves as an electrical generator. Electrical power generation systems may alternatively employ an electrical machine of the PM type as an electrical generator. Such a PM machine is capable of much higher angular velocity than a WFSM of similar output and, therefore, is capable of direct coupling to the prime mover, thereby potentially eliminating the reduction gearbox typically employed. This results in reduced weight, cost, and complexity of an electrical power generation system. However, traditional PM machines have no convenient means to alter magnetic flux for regulating their output. Therefore, it would be advantageous to have a convenient means to modify and regulate magnetic flux in a PM dynamoelectric machine.

BRIEF DESCRIPTION

According to one embodiment of the invention, described herein is a permanent magnet (PM) dynamoelectric machine with directly controllable PM flux control. The dynamoelectric machine includes a drive shaft, a PM rotor assembly with multiple PMs arranged annularly around an outer periphery of the rotor assembly, a first stator assembly comprising a ferromagnetic stator yoke, a first plurality ferromagnetic stator teeth mounted to the stator core with distal ends proximate the outer axial periphery of the rotor assembly separated by a first air gap and a first plurality of stator coils mounted between the stator teeth of the first plurality of stator teeth, and a second stator assembly comprising a second ferromagnetic stator yoke, a second plurality of ferromagnetic stator teeth mounted to the stator core with distal ends proximate an inner periphery of the rotor assembly separated by a second air gap and at least one control coil, the at least one control coil wrapped about a saturable region of each the second plurality of stator teeth. Each saturable region of the second plurality of stator teeth is operable as a magnetic diverter to divert air gap magnetic flux $\Phi g$) generated by the PMs across the air gap through the distal ends of the second plurality of stator teeth.

In addition to one or more of the features described above, or as an alternative, further embodiments may include that application of a control current Ic to the control coil at least partially magnetically saturates the saturable region for the second plurality of stator teeth to reduce shunting of air gap magnetic flux $\Phi g$, thereby controlling magnetic flux linkage $\Psi M$ between the PMs and the first plurality of stator coils In addition to one or more of the features described above, or as an alternative, further embodiments may include that application of a control current Ic to the control coil at least partially magnetically saturates the saturable region for the second plurality of stator teeth to reduce shunting of air gap magnetic flux $\Phi g$, thereby at least one of increasing generated electromagnetic force (EMF) and increasing electromagnetic torque Te to desired levels upon application of electrical power to the stator coils at lower levels of rotor assembly velocity.

In addition to one or more of the features described above, or as an alternative, further embodiments may include that the second stator assembly and the second plurality stator teeth have closed distal ends forming closed slots.

In addition to one or more of the features described above, or as an alternative, further embodiments may include that the first stator assembly comprises at least one of a laminated ferromagnetic alloy construction and a ferromagnetic stamping.

In addition to one or more of the features described above, or as an alternative, further embodiments may include that the second stator assembly comprises at least one of a laminated ferromagnetic alloy construction and a ferromagnetic stamping.

In addition to one or more of the features described above, or as an alternative, further embodiments may include that the rotor assembly comprises at least one of a laminated ferromagnetic alloy construction, a sintered magnetic powder construction, a solid steel structure, and a ferromagnetic stamping.

In addition to one or more of the features described above, or as an alternative, further embodiments may include that the PMs extend from the outer periphery of the rotor assembly to the inner periphery of the rotor assembly.

In addition to one or more of the features described above, or as an alternative, further embodiments may include that the PMs are arranged in a radial direction and magnetized tangentially.

In addition to one or more of the features described above, or as an alternative, further embodiments may include that the PMs are arranged with ferromagnetic material of the rotor assembly between the PMs, thereby forming magnetic poles in the ferromagnetic material.

In addition to one or more of the features described above, or as an alternative, further embodiments may include that each saturable region between stator teeth of the inner stator assembly exhibits high reluctance when saturated limiting magnetic flux linkage from the PMs.

In addition to one or more of the features described above, or as an alternative, further embodiments may include that the control coils connect to each other in series.

In addition to one or more of the features described above, or as an alternative, further embodiments may include that the control current Ic is direct current (DC).

In addition to one or more of the features described above, or as an alternative, further embodiments may include that adjacent windings of the control coils attach to each other to shunt magnetic fluxes from the PMs in opposition.

In addition to one or more of the features described above, or as an alternative, further embodiments may include that a first side of each control coil connects to a first side of a preceding adjacent control coil in the series connection and a second side of each control coil opposite the first side connects to second side of the following adjacent control coil in the series connection.

In addition to one or more of the features described above, or as an alternative, further embodiments may include that the inner air gap is smaller than the outer air gap.

In addition to one or more of the features described above, or as an alternative, further embodiments may include that the machine is configured and operable as at least one of a PM generator and a PM motor Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3A is a partial cross section of the PM machine with magnetic flux regulation according to an embodiment;

FIG. 3B is a partial cross section of the PM machine with magnetic flux regulation according to an embodiment;

FIG. 6A is a graphical representation of the control coils of the inner stator in accordance with an embodiment;

FIG. 6B is a graphical representation of the control coils of the inner stator in accordance with an embodiment;

DETAILED DESCRIPTION

Figure 1A:
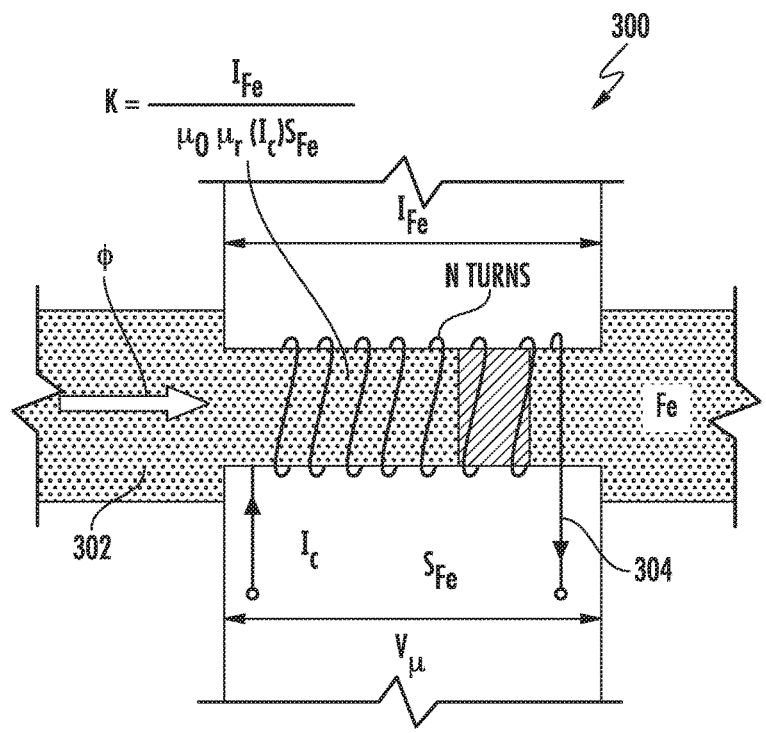
FIG. 1A depicts a simplified example of a magnetic flux diverter concept as employed in the embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In general, embodiments herein relate generally to a dual stator permanent magnet (PM) electric dynamoelectric machine with directly controllable field excitation. Using a magnetic flux diverter, the magnetic flux of the permanent magnets can be controlled and regulated. Conventional magnetic flux diverters may employ shunts and coil to manipulate and control the magnetic flux of the permanent magnets. Another approach may be to employ additional windings on the stator or rotor and utilize the saturation effect of ferromagnetic materials. These approaches may be complex depending on the construction of the machine. In an embodiment, another approach is described that facilitates controlling the magnetic flux of the permanent magnets in a dynamoelectric machine. In an embodiment a second stator having a control winding takes advantage of the saturation effect of the ferromagnetic materials in the machine to control the magnetic flux.

Figure 1B:
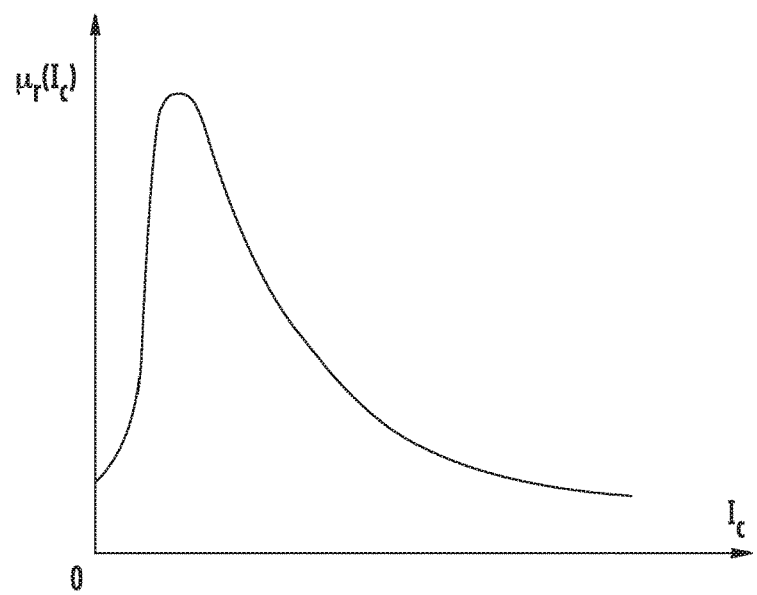
FIG. 1B depicts a variation in relative magnetic permeability with the control as employed in the embodiments.

FIG. 1 depicts a simplified example of a magnetic circuit to illustrate the concept of a magnetic flux diverter 300 as employed in the embodiments described herein. The magnetic flux diverter 300 can be understood as a conventional electromagnetic device that includes a saturable ferromagnetic material or core 302 (or a portion thereof) with a winding 304 wrapped around it. As a current (called a control current Ic) is passed through the winding 304, the magnetic properties of the ferromagnetic material or core 302 will vary to the point of saturation. To appreciate the operation of the magnetic flux diverter, discussion of the theory will be of assistance. The magnetic flux ($\Phi$) is inversely proportional to the reluctance R of the ferromagnetic core 302, where:

$$\Phi = \frac{V_\mu}{\Re} = V_\mu \frac{\mu_0 \mu_r(I_c) S_{Fe}}{l_{Fe}} \qquad (1)$$

where $V_\mu$ is the magnetic voltage drop, $\mu_0 = 0.4\pi \times 10^{-6}$ H/m is the magnetic permeability of free space, $\mu_r(I_c)$ is the relative magnetic permeability of the magnetic flux diverter 300 for the diverter material dependent on the control current $I_c$, $S_{Fe}$ is the cross section area of the flux diverter 300 and $l_{Fe}$ is the length of the flux diverter 300. The relative magnetic permeability $\mu_r$ is a function of the magnetic flux intensity. Further, it will be understood that the magnetic field intensity is proportional to the current $I_c$ in the coil 304. Thus, the relative magnetic permeability $\mu_r$, varies with the current $I_c$. This phenomenon is depicted in the graph of FIG. 1B. It is understood that the magnetic flux $\Phi$ is proportional to the relative magnetic permeability $\mu_r$, which in turn is proportional to the control current $I_c$. Therefore, as the $I_c$ increases, the permeability decreases and the reluctance for magnetic flux also increases. This characteristic of the magnetic diverter and the controllable saturation facilitates control of the magnetic flux in the described embodiments.

Figure 2:
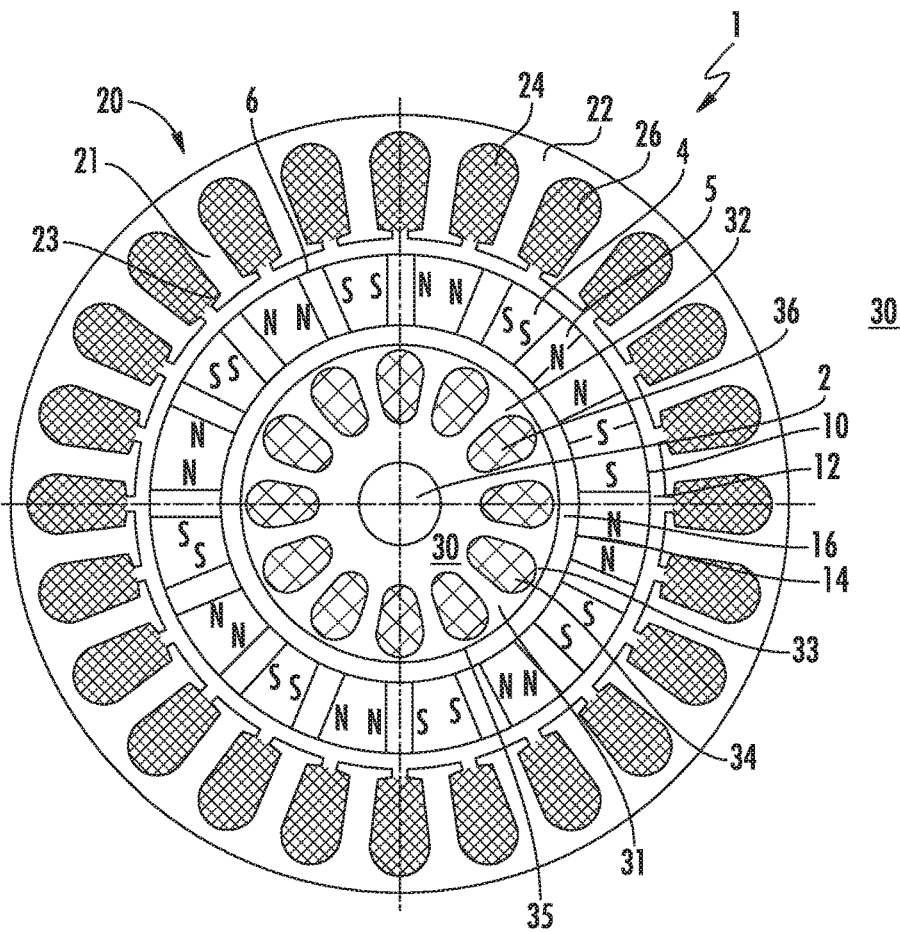
FIG. 2 is a partial cross sectional view of a permanent magnet (PM) dynamoelectric machine according to one embodiment.

FIG. 2 is a partial axial cross sectional view of a permanent magnet (PM) dynamoelectric machine 1 according to one possible embodiment. The machine 1 has a bearing 3 (See FIG. 4) disposed on a central shaft 2 coupled to a PM rotor assembly 6. The PM rotor assembly 6 comprises multiple PMs 5 arranged and mounted about its outer annular periphery 10. As shown, PMs 5 are arranged in a radial direction from the drive shaft 2. By way of example only, FIG. 2 shows the PM rotor assembly 6 with sixteen PMs 5. PMs 5 are arranged in radial direction and magnetized tangentially, that is, the PMs4 are trapezoidal or rectangular in shape, having two longer sides in radial direction. In addition, the polarity of PMs, i.e., magnetization vector, is in tangential (circumferential) direction The polarity of Pms 5 is shown in FIG. 2. There is a ferromagnetic material (rotor core 5) between the PMs 5. Magnetic poles are created in the ferromagnetic material between PMs 5. The rotor assembly 6 may be constructed of any variety of ferromagnetic materials including, but not limited to steel laminations, sintered magnetic powder material, or solid ferromagnetic material such a steel. In one embodiment steel laminations are employed. In another the rotor assembly is machined from a steel block. PMs 5 can be also arranged at greater angle than zero degrees with respect the rotor radius or can have different cross section than rectangular. The number of PMs is typically even to create pole pairs. The minimum number of PMs 5 is two and the maximum number depends on the room available and the size of the PMs 5.

A multiple pole outer stator assembly shown generally as 20, typically of the multiphase alternating current (AC) type, circumscribes the rotor assembly 6. The outer stator assembly 20 has multiple ferromagnetic stator teeth 21 coupled to a ferromagnetic stator core 22, and arranged around the periphery of the stator core 22, one stator tooth 21 for each of the poles of the stator assembly 20. A distal end 23 of each stator tooth 21 is proximate the outer annular periphery 10 of the rotor assembly 6. In one embodiment, a small outer air gap 12 exists between the outer annular periphery 10 and the stator teeth 21. The stator assembly 20 also has multiple stator coils 24 mounted in slots 26 between the stator teeth 21. In an embodiment, the ferromagnetic stator core 22 and stator teeth 21 may be constructed of any variety of ferromagnetic materials including, but not limited to steel laminations, sintered magnetic powder material, or solid ferromagnetic material such a steel. In one embodiment steel laminations are employed. The stator winding 24, also called an armature winding, is typically a three-phase winding. However, it should be understood that any number of phases can be designed. The minimum number of phases is one.

In an embodiment, an inner stator assembly shown generally as 30, is depicted concentric with and radially inward of the rotor assembly 6. The inner stator assembly 30 has a ferromagnetic stator core 32 with stator teeth 31 having distal ends 33 forming closed winding slots 36. An outer annular periphery 35 of the inner stator core 32 is proximate the inner periphery 14 of the PMs 5 of rotor assembly 6. Thereby, forming a small inner airgap 16 between the annular periphery 35 of the inner stator 30 and the inner periphery 14 of the rotor assembly 6. The inner stator assembly 30 also has an inner stator coil or control coil 34 wound in the slots 36 of the inner stator assembly 30. The inner stator coil 34 is fed with a current to control air gap magnetic flux ($\Phi_g$) generated by the PMs 5 across the air gap 16 through the inner stator 30. The current in the inner stator coil 30 is also termed the control current ($I_c$). Application of a control current ($I_c$) to the control coils 34 at least partially magnetically saturates the inner stator 30 to reduce air gap magnetic flux ($\Phi_g$), thereby increasing magnetic flux linkage ($\Psi_M$) between the PMs 5 and the outer stator coils 24 and increasing generated electromagnetic force (EMF) at lower angular velocity levels of the rotor assembly. The inner stator assembly 30 may be constructed of any variety of ferromagnetic materials including, but not limited to steel laminations, sintered magnetic powder material, or solid ferromagnetic material such steel. In one embodiment steel laminations are employed.

The hereinbefore-identified components describe a PM dynamoelectric machine 1 as may be employed in the embodiments. To better appreciate the application of the embodiments discussion of the operation of a PM dynamoelectric machine 1 as a motor and generator is provided. In operation as an electric motor, a motor drive (not shown) supplies controlled multiphase electrical power to the stator coils 24. The rotating field in the stator coils 24 causes the rotor assembly 6 to rotate in synchronization and thereby rotate the drive shaft 2. Fixed excitation flux provided by the PMs 5 in the rotor assembly 6 limits the use of the machine 1. In a PM synchronous motor drive the electrical current and voltage are limited by the constraints of the motor drive and constrains of the motor windings. For the configuration of the dynamoelectric machine 1 of an embodiment the electromagnetic torque $T_e$ that can be generated is simply approximated as the product of the magnetic flux linkage $\Psi_M$ and the q-axis armature current $I_{aq}$, in the stator coils 24 as follows.

$$T_e = 3/2 p \Psi_M I_{aq} \qquad (2)$$

where p is the number of pole pairs in the stator assembly 20.

Thus it can be seen that the torque capabilities of the dynamoelectric machine 1 may readily be controlled by controlling the magnetic flux linkage $\Psi_M$ and the q-axis armature current $I_{aq}$.

In operation as an electric generator, a prime mover (not shown) coupled to the drive shaft 2 rotates the PM rotor assembly 6. With a magnetic flux linkage ($\Psi_M$) between the PMs 5 and the stator coils 24 of the stator assembly 20, the rotating magnetic field that the rotating PMs 5 generates causes magnetic excitation flux to flow through the stator coils 24, thereby generating multiphase electrical power in the stator coils 24. Fixed excitation flux provided by the PMs 5 in the rotor assembly 6 limits the use of the machine 1, since electromotive force (EMF) that the machine 2 generates is proportional to the rate of change of magnetic flux passing through the stator coils 20 and this rate of change is proportional to the angular velocity of the rotor assembly 6. Thus, for any variation in angular velocity of the prime mover, the EMF of the machine will vary as well.

FIGS. 3A and 3B depict a partial cross section of the PM machine 1 with magnetic flux regulation according to an embodiment. The machine 1 includes the outer stator assembly 20 and inner stator assembly 30 and PM rotor assembly 6 between the stators assemblies 20, 30 as described above. A narrow ferromagnetic bridge 37 at the distal end 33 of the stator teeth 31, which closes the slot 36 of the inner stator assembly and forms a saturable portion of the inner stator assembly 30. This ferromagnetic bridge 37 adjacent to the air gap 16 with the inner stator coil 34 forms a magnetic flux diverter 300 (as described with respect to FIG. 1) that is operative with the control current $I_c$ to divert magnetic flux excited by the PMs 5. As shown, PMs 5 originate magnetic flux that is substantially directed perpendicular to the radial direction based on the poles of the PMs 5. In an embodiment, the inner air gap (between the PM rotor assembly 6 and inner stator assembly 30) is smaller than the outer air gap (i.e., the air gap between the rotor assembly and outer stator assembly 20).

In FIG. 3A, when the control current $I_c$=0, the magnetic flux diverter is unsaturated and, as described above, a large portion of magnetic flux produced by PMs 5 as depicted by flux lines 40 traverses the inner air gap 16 and penetrates to the magnetic flux diverter of the inner stator assembly 30 The unsaturated magnetic flux diverter of the inner stator assembly 30 is a good conductor for magnetic flux (high magnetic permeability). Only small portion of the PM flux as depicted by flux lines 42 is linked with the stator coils 24 located in the slots of the outer stator assembly 20. Conversely, as depicted in FIG. 3B, when the control current $I_c$>0 the magnetic flux diverter of the inner stator assembly 30 becomes saturated and exhibits high reluctance for the magnetic flux. Under these conditions, a smaller portion of magnetic flux as depicted by flux lines 44, traverses the inner air gap 16 and penetrates to the magnetic flux diverter of the inner stator assembly 30. A saturated magnetic flux diverter has low magnetic permeability and exhibits high reluctance for the magnetic flux. Moreover, more magnetic flux, as depicted by flux lines 46, is linked with the stator coils 24 of outer stator assembly 20. Therefore, it can be seen that by varying the control current $I_c$, the magnetic flux linked with the stator coils 24 can be regulated. More magnetic flux linked with the stator coils 24 of the outer stator assembly 20 means that higher electromotive force (EMF) is induced in the stator windings 24. Greater control of the induced EMF directly facilitates greater control of the electrodynamic machine 1. This effect can be both utilized in application of the electrodynamic machine 1 as a variable speed generator and for flux weakening control as an electric motor.

Figure 4:
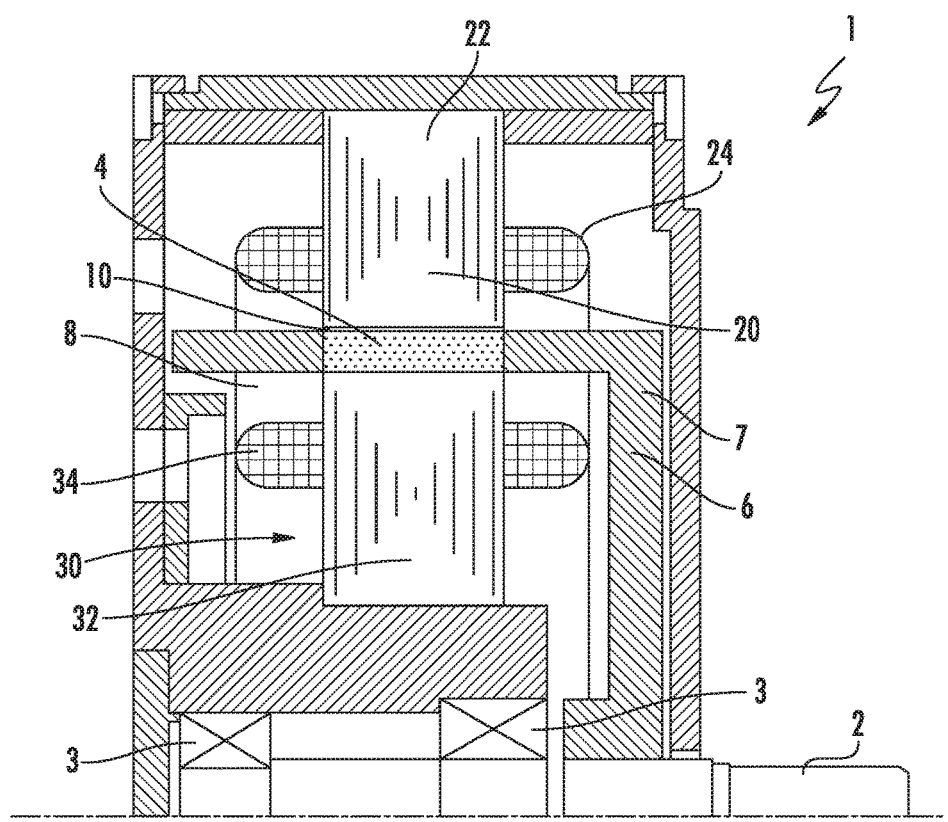
FIG. 4 is a partial radial or longitudinal cross section of the permanent magnet (PM) dynamoelectric machine according to one embodiment of the invention.

FIG. 4 is a partial radial or longitudinal cross section of the permanent magnet (PM) dynamoelectric machine 1 according to one possible embodiment. The machine 1 has a bearing 3 mounted central shaft 2 coupled to a PM rotor assembly 6. The PM rotor assembly 6 is cup or bowl shaped with a base 7 and side 8. The side 8 is proximal to each of the stator core 22 and 32 for the outer stator 20 and inner stator 30, respectively. The sides also include the multiple PMs 5 mounted about its annular periphery 10. The PMs 5 are arranged in radial direction and magnetized tangentially. The sides 8 are formed of ferromagnetic material (rotor core) between PMs 5. Magnetic poles are created in the ferromagnetic material between PMs 5. (see FIGS. 3A and 3B). It will be appreciated that while the embodiments have been described with respect to the outer stator 20 including the armature windings for the dynamoelectric machine 1 and the inner stator 30 including the control coil 34, he armature winding can also be installed in the an inner stator 30 and control winding in the outer stator 20.

Figure 5:
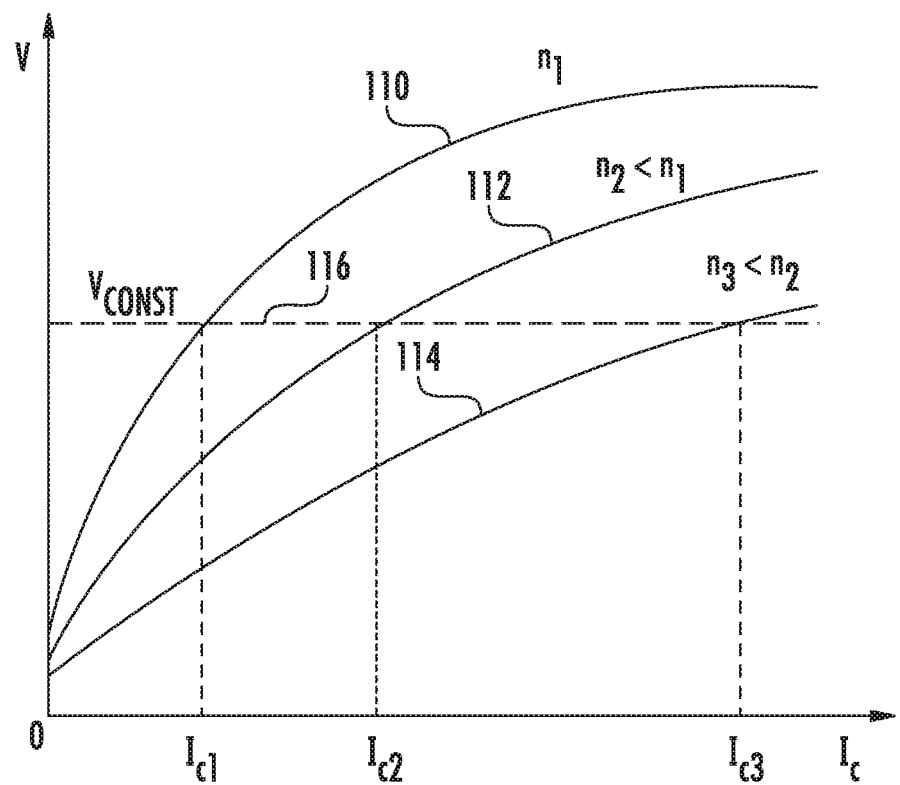
FIG. 5 is a graphical representation of voltage as a function of three different velocities of the PM machines of an embodiment.

FIG. 5 is a graphical representation of voltage V as a function of three different velocities $n_1$, $n_2$ and $n_3$ (where $n_3 < n_2 < n_1$) of the PM machines 1. Line 110 represents velocity $n_1$, line 112 represents velocity $n_2$ and line 114 represents velocity $n_3$. Line 116 represents a constant reference voltage output $V_{const}$ for application of respective control currents $I_{c1}$, $I_{c2}$ and $I_{c3}$ to the stator coil 34 of the inner stator 30. It should be appreciated that one advantage inherent in the regulation for the magnet flux diverter is that it exhibits the characteristics desired to meet aircraft generator voltage regulation requirements. That is, the smallest output voltage is at zero control current and maximum output voltage is at maximum control current. Therefore, in operation, should the controller providing the control current $I_c$ become inoperative (e.g., open circuit), the terminal voltage of the generator would be at its minimum value. If the control winding is shorted or partially shorted, the magnetic saturation of the diverter is reduced and the terminal voltage also decreases. To keep constant output voltage, the control current $I_c$ is varied and maintained a desired level as shown in FIG. 5. For example, if the speed increases from $n_3$ to $n_1$, the control current must be reduced from $I_{c3}$ to $I_{c1}$ to reduce the reluctance of flux diverter and decrease the magnetic flux linked with the outer stator coil 24.

This novel double-stator PM machine can also operate as a synchronous motor with flux weakening control, e.g., in electric traction vehicle or electric landing gears of aircraft and the like.

FIGS. 6A and 6B provide a graphical representation of configurations for the inner stator coil 34 of the inner stator 30. The diagram depicts the inner stator coil 34 as the stator coil is wound through the closed stator teeth of the inner stator 30. The control current $I_c$ is depicted with directions (represented by arrows 41), as provided by control current source or regulator 52 (See FIG. 7). It should be appreciated that there may be a plurality of inner stator coils 34 connected and grouped in various arrangements. The connections of the inner stator coil 34 may include a serial connection of the control coils 34 with adjacent control coils 34 in phase opposition, such as a first side of each control coil 34, connecting to a first side of a preceding adjacent control coil 24 in the series connection and a second side of each control coil 24 opposite the first side connecting to second side of the following adjacent control coil 24 in the series connection. These kinds of arrangements may be advantageous depending on the type of excitation employed for the control current $I_c$. In the second configuration of control coils 34 (FIG. 6b) the currents in the neighboring sides of coils are in opposite direction, i.e., the input terminal of every second coil is connected to the input terminal of the next coil (or the output terminal of every second coil is connected to the output terminal of the next coil).

Figure 7:
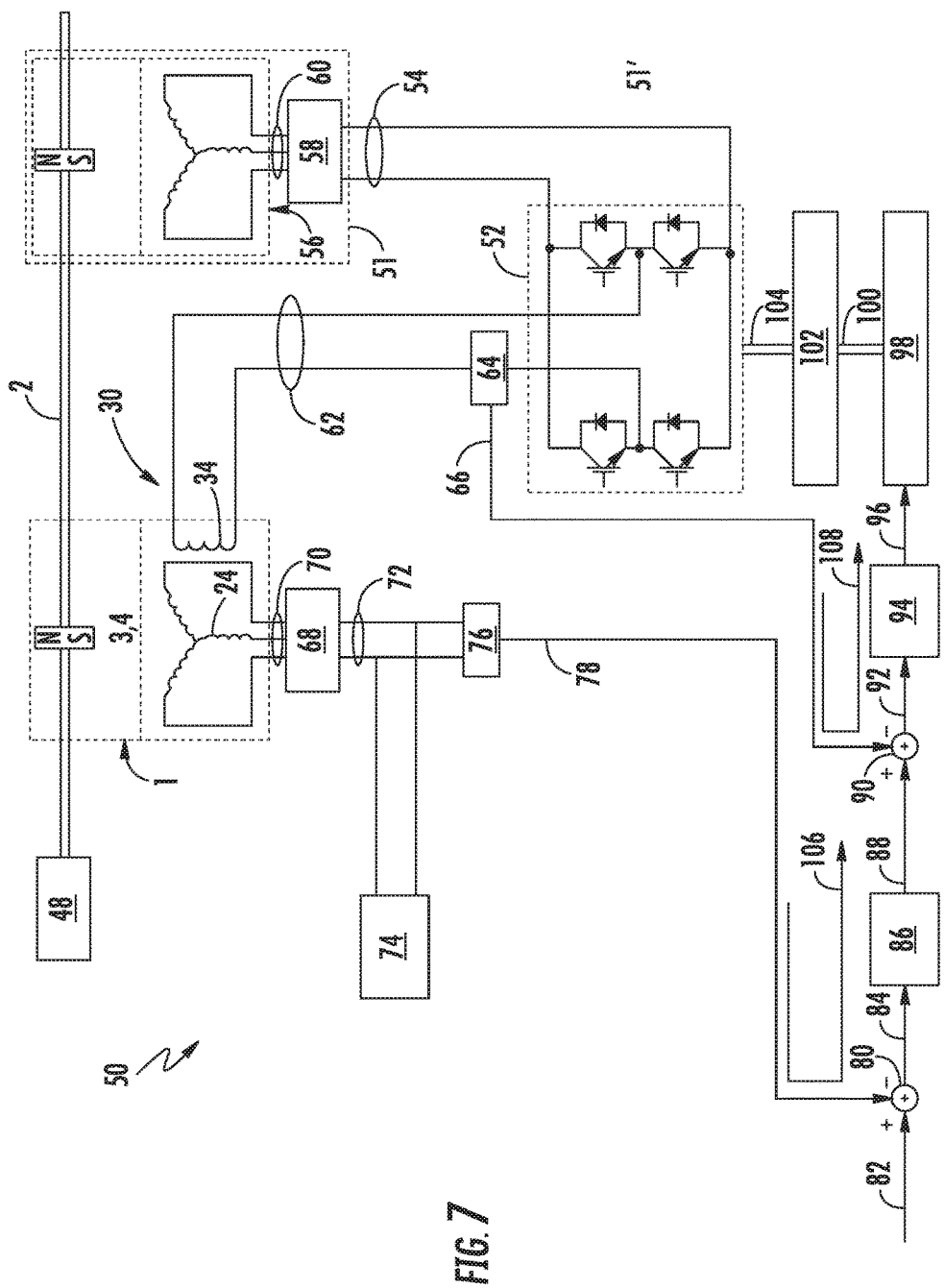
FIG. 7 is a high-level schematic representation of an electrical power generating system according to a possible embodiment.

FIG. 7 is a high-level schematic representation of an electrical power generating system 50 according to a possible embodiment. While in an embodiment the description of the systems and applications for the dynamoelectric machine 1 are made with respect to a power generation system, it should be appreciated that other configurations and systems employing the dynamoelectric machine 1 are possible and within the scope of the claims including, for example motor systems, motor control system and the like. In an embodiment the electrical power generating system may include a prime mover 48, such as an aeronautical gas turbine engine, and the PM dynamoelectric machine with magnetically saturable ferromagnetic second stator 30 as described herein such as the PM dynamoelectric machine 1 as shown in FIGS. 2-4. In operation, the prime mover 48 drives the machine 1, by way of a drive shaft 2. An auxiliary power source 51 supplies power to a control current regulator 52 by way of an auxiliary power bus 54.

The auxiliary power source 51 may be AC or DC. It may include a multiphase AC auxiliary PM dynamoelectric machine driven by the drive shaft 2 and a multiphase AC rectifier 58 that receives multiphase AC power from the auxiliary machine 56 on a multiphase AC auxiliary power bus 60 and converts it to DC power on the auxiliary power bus 54. Alternatively, the auxiliary power source 51 may be a separately powered source or a battery with chopper shown as 51'. The auxiliary machine 56 may be any conventional dynamoelectric machine operable to generate power and power the auxiliary bus 54.

The control current regulator 52 preferably comprises an H-bridge circuit. The regulator 52 supplies control current $I_c$ to control coil(s) i.e., stator coil 34 of the inner stator 20 in the machine 1 by way of a control current supply bus 62. A control current sensor 64 monitors the level of control current passing through the control current supply bus 62 and generates a corresponding control current feedback signal representative of its level on a control current feedback signal line 66.

In an embodiment, a multiphase AC main power rectifier 68 receives multiphase AC power from the stator coils 24 of the machine 1 on a multiphase AC main power bus 70. In an embodiment, the AC power is converted to DC main power on a DC main power bus 72 for supply to a DC load 74. In an embodiment, a sensor detects an operating characteristic of the dynamoelectric machine 1, for example, output voltage, output current, frequency and the like. Likewise, in a motor application, operating characteristics such as motor speed, torque and the like may be measured. One or more main power voltage sensor(s) 76 monitor the level of voltage on the AC bus 72 and/or DC main power bus 72 and generates a corresponding voltage feedback signal (DC shown) representative of its level on a main power voltage feedback signal line 78. The AC power can also be converted to the DC power and then again inverted to the AC power of different frequency and different voltage level.

A voltage signal comparator 80 receives a main power voltage reference signal on a voltage reference line 82 and compares it to the main power voltage feedback signal on the main power voltage signal line 78 to generate a voltage difference signal representative of the difference between them on a voltage difference signal line 84. A main power voltage feedback proportional-plus-integral (PI) controller 86 receives the voltage difference signal on the voltage difference signal line 84 and converts it to a stable control current reference signal on a control current reference signal line 88.

A current signal comparator 90 compares the control current reference signal on the control current reference signal line 88 with the control current feedback signal on the control current feedback signal line 66 to generate a current difference signal on a current difference signal line 92. A control current feedback PI controller 94 receives the current difference signal on the current difference signal line 92 and converts it to a stable control current regulating signal on a control current regulating signal line 96.

A pulse width modulator (PWM) circuit 98 receives the control current regulating signal on a control current regulating signal line 96 and generates corresponding PWM control signals on a PWM control signal bus 100. A gate drive circuit 102 receives the PWM control signals on a PWM control signal bus 100 and generates corresponding gate drive signals on a gate drive signal bus 104.

The control current regulator 52 receives the gate drive signals on the gate drive signal bus 104 to produce a level of the control current $I_c$ on the control current supply bus 62 responsive to a main power voltage feedback loop 106 and a control current feedback loop 108.

Figure 8:
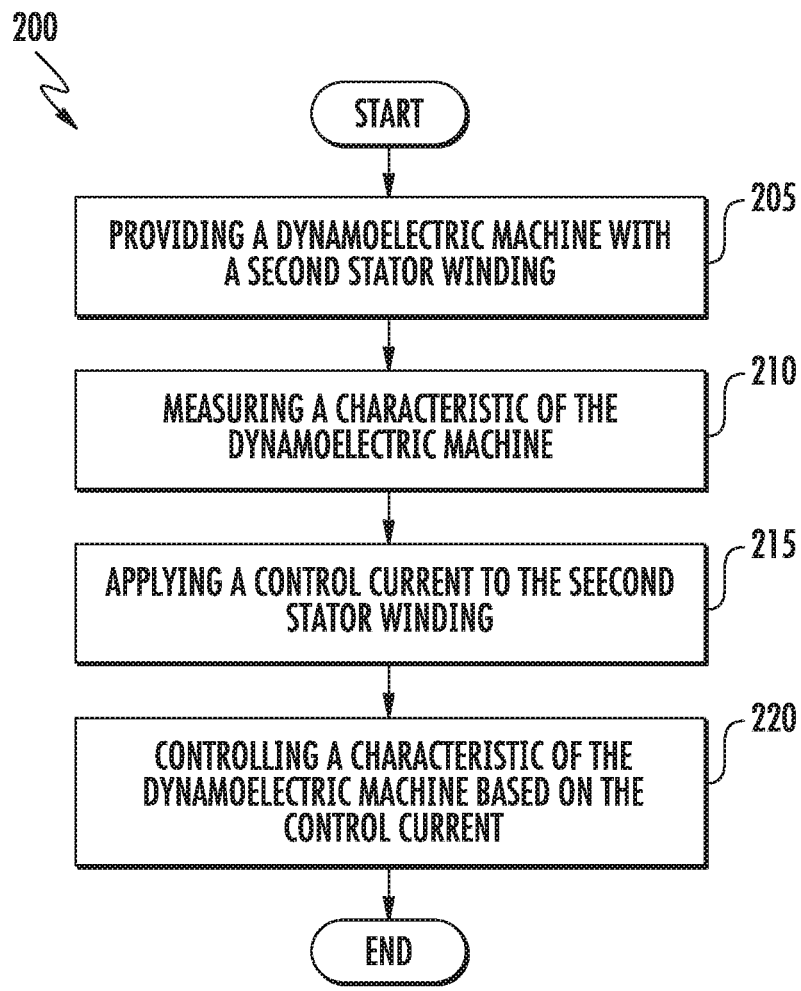
FIG. 8 is a flowchart of the method of controlling the flux in a PM dynamoelectric machine in accordance with an embodiment.

Turing now to FIG. 8, where a flowchart of the method 200 of controlling the flux in a PM dynamoelectric machine is depicted. The method is initiated at process step 205 by providing a dynamoelectric machine 1 with a second stator assembly 30 including a stator winding 34 in accordance with the embodiments described herein. At process step 210 an operating characteristic, e.g., voltage, current output from a generator or speed, torque and the like for motor applications, of the dynamoelectric machine is measured. Based on the measured operating characteristic the control current Ic in the stator winding 34 is applied at process step 215 and varied to maintain the operating characteristic at a desired level as depicted at process step 220.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A permanent magnet (PM) dynamoelectric machine with directly controllable PM flux control comprising:
   a drive shaft;
   a PM rotor assembly with multiple PMs arranged annularly around an outer periphery of the PM rotor assembly;
   a first stator assembly comprising a ferromagnetic stator yoke, a first plurality ferromagnetic stator teeth mounted to the stator core with distal ends proximate the outer axial periphery of the rotor assembly separated by a first air gap and a first plurality of stator coils mounted between the stator teeth of the first plurality of stator teeth; and
   a second stator assembly comprising a second ferromagnetic stator yoke, a second plurality of ferromagnetic stator teeth mounted to the stator core with distal ends proximate an inner periphery of the rotor assembly separated by a second air gap and at least one control coil, the at least one control coil wrapped about a saturable region of each the second plurality of stator teeth;
   wherein each saturable region of the second plurality of stator teeth is operable as a magnetic diverter to divert air gap magnetic flux (Φg) generated by the multiple PMs across the second air gap through the distal ends of the second plurality of stator teeth.

2. The machine of claim 1, wherein application of a control current Ic to the at least one control coil at least partially magnetically saturates the saturable region for the second plurality of stator teeth to reduce shunting of air gap magnetic flux Φg, thereby controlling magnetic flux linkage $\Psi_M$ between the multiple PMs and the first plurality of stator coils.

3. The machine of claim 1, wherein application of a control current $I_c$ to the at least one control coil at least partially magnetically saturates the saturable region for the second plurality of stator teeth to reduce shunting of air gap magnetic flux Φg, thereby at least one of increasing generated electromagnetic force (EMF) and increasing electromagnetic torque $T_c$ to desired levels upon application of electrical power to the stator coils at lower levels of rotor assembly angular velocity.

4. The machine of claim 1, wherein the second stator assembly and the second plurality stator teeth have closed distal ends forming closed slots.

5. The machine of claim 1, wherein the first stator assembly comprises at least one of a laminated ferromagnetic alloy construction and a ferromagnetic stamping.

6. The machine of claim 1, wherein the second stator assembly comprises at least one of a laminated ferromagnetic alloy construction and a ferromagnetic stamping.

7. The machine of claim 1, wherein the PM rotor assembly comprises at least one of a laminated ferromagnetic alloy construction, a sintered magnetic powder construction, a solid steel structure, and a ferromagnetic stamping.

8. The machine of claim 1, wherein the multiple PMs extend from the outer periphery of the rotor assembly to the inner periphery of the PM rotor assembly.

9. The machine of claim 1, wherein the multiple PMs are arranged in a radial direction and magnetized tangentially.

10. The machine of claim 1, wherein the multiple PMs are arranged with ferromagnetic material of the PM rotor assembly between the multiple PMs, thereby forming magnetic poles in the ferromagnetic material.

11. The machine of claim 1, wherein each saturable region between stator teeth of the second stator assembly exhibits high reluctance when saturated limiting magnetic flux linkage from the multiple PMs.

12. The machine of claim 1, wherein the at least one control coil is a plurality of control coils connected in series.

13. The machine of claim 2, wherein the control current Ic is direct current (DC).

14. The machine of claim 13, wherein adjacent windings of the control coils attach to each other to shunt magnetic fluxes from the multiple PMs in opposition.

15. The machine of claim 13, wherein the at least one control coil is a plurality of control coils and a first side of each of the plurality of control coils connects to a first side of a preceding adjacent one of the plurality of control coils in series and a second side of each of the plurality of control coils opposite the first side connects to the second side of the following adjacent control coil.

16. The machine of claim 1, wherein the second air gap is smaller than the first air gap.

17. The machine of claim 1, wherein the machine is configured and operable as at least one of a PM generator and a PM motor.

18. A permanent magnet (PM) electric generator system with directly controllable field excitation control comprising:
   a prime mover;
   a main PM generator coupled to the prime mover comprising a PM rotor assembly with multiple PMs arranged around an outer axial periphery of the rotor assembly, a first stator assembly comprising a ferromagnetic stator core, a first plurality of ferromagnetic stator teeth mounted to the stator with distal ends proximate the outer axial periphery of the rotor assembly separated by an air gap and multiple stator coils mounted between the stator teeth, of the first plurality of stator teeth; and a second stator assembly comprising a second ferromagnetic stator yoke, a second plurality of ferromagnetic stator teeth mounted to the stator core with distal ends proximate an inner periphery of the rotor assembly separated by a second air gap and at least one control coil, the at least one control coil wrapped about a saturable region of the second plurality of stator teeth; and wherein each saturable region of the second plurality of stator teeth is operable as a magnetic diverter to divert air gap magnetic flux Φg generated by the multiple PMs across the air gap through the distal ends of the second plurality of stator teeth;
   a main power rectifier system for converting multiphase alternating current (AC) associated with stator coils to direct current (DC) main power on a DC power bus that feeds a DC load;
   an auxiliary power source;
   a control current regulator that regulates current from the auxiliary power source to produce control current for a control coil;
   a main power voltage feedback loop that compares voltage on the DC power bus to a reference voltage and generates a reference control current signal representative of the difference; and
   a control current feedback loop that compares the control current to the reference control current signal and generates a control current regulating signal representative of the difference that changes the control current produced by the control current regulator.

19. The system of claim 18, wherein the auxiliary power source comprises a multiphase AC auxiliary machine driven by the prime mover and a multiphase AC rectifier that converts AC power generated by the multiphase AC auxiliary machine to DC power.

20. The system of claim 18, further comprising a pulse width modulator (PWM) circuit that receives the control current regulating signal and generates corresponding PWM control signals.

* * * * *